(12) United States Patent
Okahashi et al.

(10) Patent No.: US 12,724,298 B2
(45) Date of Patent: Sep. 1, 2026

(54) OPTICAL WAVEGUIDE DEVICE, AND OPTICAL MODULATION DEVICE AND OPTICAL TRANSMISSION APPARATUS USING SAME

(71) Applicant: SUMITOMO OSAKA CEMENT CO., LTD., Tokyo (JP)

(72) Inventors: Kosuke Okahashi, Tokyo (JP); Shingo Takano, Tokyo (JP)

(73) Assignee: SUMITOMO OSAKA CEMENT CO., LTD., Tokyo (JP)

( * ) Notice: Subject to any disclaimer, the term of this patent is extended or adjusted under 35 U.S.C. 154(b) by 0 days.

(21) Appl. No.: 18/289,102

(22) PCT Filed: Mar. 30, 2022

(86) PCT No.: PCT/JP2022/016292

§ 371 (c)(1),
(2) Date: Oct. 31, 2023

(87) PCT Pub. No.: WO2023/188195

PCT Pub. Date: Oct. 5, 2023

(65) Prior Publication Data

US 2025/0013085 A1 Jan. 9, 2025

(51) Int. Cl.

*G02F 1/01* (2006.01)
*G02B 6/12* (2006.01)
*G02F 1/035* (2006.01)

(52) U.S. Cl.

CPC ............... *G02F 1/035* (2013.01); *G02B 6/12* (2013.01); *G02F 1/01* (2013.01); *G02F 2201/07* (2013.01); *G02F 2202/20* (2013.01)

(58) Field of Classification Search

CPC ... G02B 6/12; G02F 1/01; G02F 1/035; G02F 2202/20

See application file for complete search history.

(56) References Cited

U.S. PATENT DOCUMENTS 6,069,729 A 5/2000 Gill
7,079,714 B2 * 7/2006 Chowdhury .......... G02F 1/2255 385/40

(Continued)

FOREIGN PATENT DOCUMENTS

JP H07-028008 A 1/1995
JP 2021-105650 A 7/2021

(Continued)

*Primary Examiner* — Ryan A Lepisto
(74) *Attorney, Agent, or Firm* — IPHORGAN LTD.

(57) ABSTRACT

An object of the present invention is to provide an optical waveguide device that prevents peeling of an optical waveguide substrate and that suppresses a propagation loss of a light wave of an optical waveguide.

An optical waveguide device of the present invention includes an optical waveguide substrate 1 on which an optical waveguide 10 is formed, a reinforcing substrate 11 disposed under the optical waveguide substrate, a lower buffer layer B1 disposed between the optical waveguide substrate and the reinforcing substrate to join both of the optical waveguide substrate and the reinforcing substrate, and an upper buffer layer B2 disposed on an upper side of the optical waveguide substrate in contact with the optical waveguide substrate, in which a thickness d2 of the upper buffer layer is formed to be smaller than a thickness d1 of the lower buffer layer (d2<d1).

8 Claims, 4 Drawing Sheets

(56) References Cited

U.S. PATENT DOCUMENTS 11,624,965 B2 * 4/2023 Makino ................. G02F 1/2257
385/2
11,693,290 B2 * 7/2023 Makino ................... G02F 1/035
385/1
11,719,964 B2 * 8/2023 Sugiyama ............. G02F 1/0356
385/2
11,892,716 B2 * 2/2024 Sugiyama ............... G02F 1/035
11,936,428 B2 * 3/2024 Makino ................... G02F 1/035
12,019,349 B2 * 6/2024 Sugiyama ............. G02F 1/2255
12,044,909 B2 * 7/2024 Sugiyama ............... G02F 1/035
12,078,877 B2 * 9/2024 Sugiyama ............... G02F 1/035
12,292,626 B2 * 5/2025 Huang .................. G02F 1/0316
2004/0136634 A1 * 7/2004 Chowdhury .......... G02F 1/2255
385/40
2021/0325760 A1 10/2021 Makino
2022/0004031 A1 1/2022 Sugiyama
2022/0026634 A1 * 1/2022 Bahadori ........... G02B 6/29338
2022/0050351 A1 2/2022 Makino
2023/0026594 A1 1/2023 Okahashi
2023/0079367 A1 * 3/2023 Huang ................. G01N 21/255
356/326

FOREIGN PATENT DOCUMENTS

JP 2021-173792 A 11/2021
JP 2022-013232 A 1/2022
JP 2022-032687 A 2/2022

* cited by examiner

OPTICAL WAVEGUIDE DEVICE, AND OPTICAL MODULATION DEVICE AND OPTICAL TRANSMISSION APPARATUS USING SAME

CROSS REFERENCE TO RELATED APPLICATIONS

This application is a national stage completion application of PCT Application No. PCT/JP2022/016292, filed Mar. 30, 2022. The application is incorporated by reference herein in its entirety.

TECHNICAL FIELD

The present invention relates to an optical waveguide device, and an optical modulation device and an optical transmission apparatus using the same, and particularly to an optical waveguide device including an optical waveguide substrate on which an optical waveguide is formed, and a reinforcing substrate disposed under the optical waveguide substrate.

BACKGROUND ART

In the field of optical measurement technology or in the field of optical communication technology, optical waveguide devices such as an optical modulator using an optical waveguide substrate on which an optical waveguide is formed have been widely used. In a general optical waveguide device, an optical waveguide is formed on a substrate of lithium niobate (LN) or the like having an electro-optic effect, and an electrode that applies an electric field to the optical waveguide is formed on the substrate.

Patent Literatures No. 1 and 2 suggest a configuration in which buffer layers (B1, B2) are disposed on and under a substrate 1 to interpose the optical waveguide substrate 1 between the buffer layers as illustrated in FIG. 1. Particularly, a reinforcing substrate 11 is disposed on the lower buffer layer B1 to reinforce mechanical strength of the optical waveguide substrate in a case where the optical waveguide substrate is a thin plate of a several μm or lower. The lower buffer layer B1 achieves an effect of suppressing an optical absorption loss in the reinforcing substrate.

In addition, the upper buffer layer B2 is a protective film that functions to suppress absorption of a light wave propagating through an optical waveguide 10 by an electrode disposed on the optical waveguide substrate or scattering of the light wave propagating through the optical waveguide caused by roughness of a surface of the optical waveguide 10.

Size reduction of the device itself is required for the optical waveguide device and the optical modulation device. As means for implementing this, it is suggested to strengthen confinement of light by setting a height or a width of the optical waveguide to approximately 1 μm or lower and to dispose the optical waveguide by bending the optical waveguide.

Patent Literature No. 1 discloses configuring the upper buffer layer B2 and the lower buffer layer B1 with the same material and setting the upper buffer layer B2 and the lower buffer layer B1 to have the same film thickness (d2=d1) in order to prevent damage or characteristic deterioration of the substrate 1 caused by stress applied to the substrate by the buffer layers in the case of using a thin optical waveguide substrate of a several μm or lower.

However, in a case where Si, silicon on insulator (SOI; a substrate in which a silicon layer is formed on silicon oxide), or the like is used in the reinforcing substrate 11, the reinforcing substrate has a higher refractive index than the optical waveguide substrate. Thus, the optical absorption loss is increased. Accordingly, it is required to set the thickness of the lower buffer layer to approximately 2 μm to 3 μm.

Furthermore, as disclosed in Patent Literature No. 1, in a case where a dense $SiO_2$ film of 2 μm is formed on the substrate 1 of LN as a buffer layer, the LN substrate 1 peels because of internal stress caused by expansion or contraction of the buffer layer caused by a change in a temperature.

CITATION LIST

Patent Literature

[Patent Literature No. 1] Japanese Laid-open Patent Publication No. 2021-105650

[Patent Literature No. 2] Japanese Laid-open Patent Publication No. 2021-173792

SUMMARY OF INVENTION

Technical Problem

An object to be solved by the present invention is to solve the above problem and to provide an optical waveguide device that prevents peeling of an optical waveguide substrate and that suppresses a propagation loss of a light wave of an optical waveguide. Furthermore, an optical modulation device and an optical transmission apparatus using the optical waveguide device are provided.

Solution to Problem

In order to solve the object, an optical waveguide device of the present invention, and an optical modulation device and an optical transmission apparatus using the same have the following technical features.

(1) An optical waveguide device includes an optical waveguide substrate on which an optical waveguide is formed, a reinforcing substrate disposed under the optical waveguide substrate, a lower buffer layer disposed between the optical waveguide substrate and the reinforcing substrate to join both of the optical waveguide substrate and the reinforcing substrate, and an upper buffer layer disposed on an upper side of the optical waveguide substrate in contact with the optical waveguide substrate, in which a thickness of the upper buffer layer is formed to be smaller than a thickness of the lower buffer layer.

(2) In the optical waveguide device according to (1), the thickness of the lower buffer layer is set within a range of 1 μm to 10 μm, and the thickness of the upper buffer layer is set within a range of 0.1 μm to 5 μm.

(3) In the optical waveguide device according to (1) or (2), density of the lower buffer layer is higher than density of the upper buffer layer.

(4) In the optical waveguide device according to (1) or (2), the upper buffer layer and the lower buffer layer are transparent insulating films including silicon oxide, magnesium fluoride, calcium fluoride, a mixture of silicon oxide and an oxide of one or more elements selected from metal elements of groups 3 to 8, group 1b, and group 2b in a periodic table and semiconductor elements except silicon, or an oxide of silicon and one or more elements selected from the metal elements and the semiconductor elements.

(5) In the optical waveguide device according to (1) or (2), refractive indices of the upper buffer layer and the lower buffer layer are lower than a refractive index of the optical waveguide substrate.

(6) In the optical waveguide device according to (1) or (2), electrical resistivity of the upper buffer layer and the lower buffer layer is $10^8$ Ωcm or higher and $10^{16}$ Ωcm or lower.

(7) An optical modulation device includes the optical waveguide device according to (1) or (2), a case accommodating the optical waveguide device, and an optical fiber through which a light wave is input into the optical waveguide or output from the optical waveguide.

(8) In the optical modulation device according to (7), the optical waveguide device includes a modulation electrode for modulating a light wave propagating through the optical waveguide, and an electronic circuit that amplifies a modulation signal to be input into the modulation electrode of the optical waveguide device is provided inside the case.

(9) An optical transmission apparatus includes the optical modulation device according to (7), and an electronic circuit that outputs a modulation signal causing the optical modulation device to perform a modulation operation.

Advantageous Effects of Invention

In the present invention, an optical waveguide device includes an optical waveguide substrate on which an optical waveguide is formed, a reinforcing substrate disposed under the optical waveguide substrate, a lower buffer layer disposed between the optical waveguide substrate and the reinforcing substrate to join both of the optical waveguide substrate and the reinforcing substrate, and an upper buffer layer disposed on an upper side of the optical waveguide substrate in contact with the optical waveguide substrate, in which a thickness of the upper buffer layer is formed to be smaller than a thickness of the lower buffer layer. Thus, it is possible to suppress generation of stress applied by the upper buffer layer and to suppress damage to the substrate such as peeling of the optical waveguide substrate. In addition, it is possible to implement suppression of a propagation loss of the optical waveguide as the buffer layer.

Furthermore, the optical waveguide device having such advantageous characteristics can also be used to provide an optical modulation device and an optical transmission apparatus that achieve the same effect.

DESCRIPTION OF EMBODIMENTS

Hereinafter, an optical waveguide device of the present invention will be described in detail using preferred examples.

Figure 1:
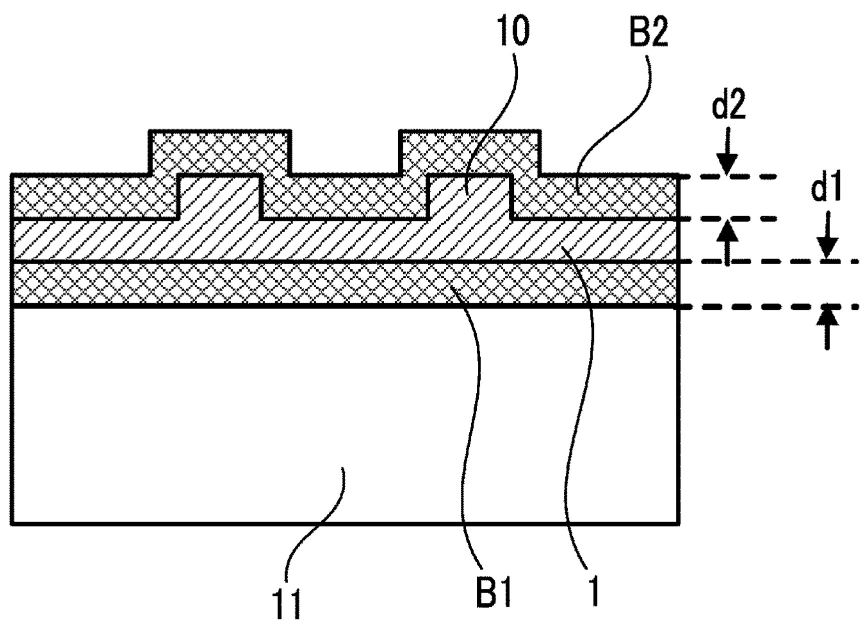
FIG. 1 is a cross section view illustrating an example of an optical waveguide device in the related art.
Figure 2:
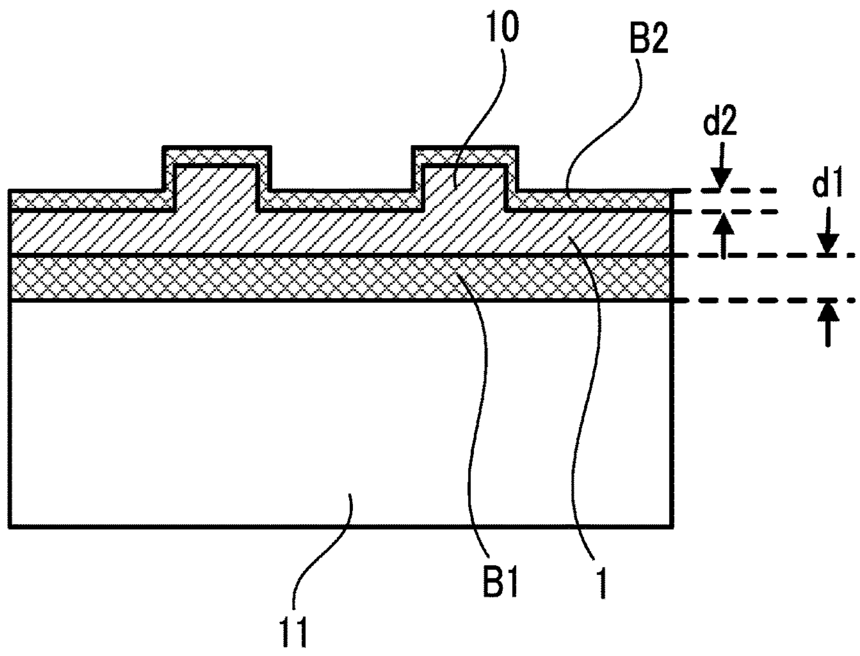
FIG. 2 is a cross section view illustrating an example of an optical waveguide device of the present invention.

A cross section view illustrating an example of the optical waveguide device of the present invention is illustrated in FIG. 2.

The optical waveguide device of the present invention includes an optical waveguide substrate 1 on which an optical waveguide 10 is formed, a reinforcing substrate 11 disposed under the optical waveguide substrate, a lower buffer layer B1 disposed between the optical waveguide substrate and the reinforcing substrate to join both of the optical waveguide substrate and the reinforcing substrate, and an upper buffer layer B2 disposed on an upper side of the optical waveguide substrate in contact with the optical waveguide substrate, in which a thickness d2 of the upper buffer layer is formed to be smaller than a thickness d1 of the lower buffer layer (d2<d1).

As the optical waveguide substrate 1 used in the optical waveguide device of the present invention, a substrate having an electro-optic effect can be used. Specifically, substrates of lithium niobate (LN), lithium tantalate (LT), lead lanthanum zirconate titanate (PLZT), and the like or base materials obtained by doping these substrate materials with MgO or the like can be used. In addition, these materials can be formed into films using a sputtering method, a vapor deposition method, or a vapor-phase growth method such as a CVD method. Furthermore, semiconductor substrates and the like can be used.

As a method of forming the optical waveguide 10, a rib type optical waveguide obtained by forming a part corresponding to the optical waveguide to have a protruding shape in the substrate by, for example, etching the substrate 1 other than the optical waveguide or by forming grooves on both sides of the optical waveguide can be used. Furthermore, a refractive index can be further increased by diffusing Ti or the like on a surface of the substrate using a thermal diffusion method, a proton exchange method, or the like in accordance with the rib type optical waveguide. In addition, while the optical waveguide can be formed by forming a high-refractive index region obtained by thermally diffusing Ti or the like on the substrate 1, the rib type optical waveguide is more preferable because confinement of light is increased in the micro optical waveguide having a width and a height of approximately 1 μm.

A thickness of the substrate (thin plate) 1 on which the optical waveguide 10 is formed is set to 10 μm or lower, more preferably 5 μm or lower, and still more preferably 1 μm or lower in order to achieve velocity matching between a microwave of a modulation signal and a light wave. In addition, a height of the rib type optical waveguide is set to 4 μm or lower, more preferably 3 μm or lower, and still more preferably 1 μm or lower or 0.4 μm or lower.

In the optical waveguide substrate 1 on which the optical waveguide is formed, a reinforcing substrate 11 is joined to a lower side of the optical waveguide substrate 1 through the lower buffer layer B1 as illustrated in FIG. 2 in order to increase mechanical strength. The lower buffer layer B1 and the reinforcing substrate 11 are adhesively fixed via direct joining or through an adhesive layer of resin or the like. The reinforcing substrate to be directly joined preferably has, but is not limited to, a lower refractive index than the optical waveguide or than the substrate on which the optical waveguide is formed. In addition, a substrate including a material, for example, an oxide layer of crystal or of glass, having a similar coefficient of thermal expansion to the optical waveguide or the like is preferably used as the reinforcing substrate. Furthermore, the same LN substrate as the optical waveguide substrate, or a composite substrate obtained by forming a silicon oxide layer on a silicon substrate and a composite substrate obtained by forming a silicon oxide layer on an LN substrate, which are abbreviated to SOI and LNOI, can also be used.

A material used in the buffer layer is preferably a material having a lower refractive index and higher transparency than the optical waveguide substrate 1 of LN or the like. For example, $SiO_2$, $Al_2O_3$, MgF, $La_2O_3$, ZnO, MgO, $CaF_2$, or $Y_2O_3$ can be used.

In addition, a mixture of silicon oxide and an oxide of one or more elements selected from metal elements of groups 3 to 8, group 1b, and group 2b in the periodic table and semiconductor elements except silicon, or an oxide of silicon and one or more elements selected from the metal elements and the semiconductor elements can be used. Specifically, electrical resistivity of the buffer layer is preferably set to $10^8$ Ωcm or higher and $10^{16}$ Ωcm or lower by doping silicon oxide with at least one or more of oxides of, for example, metal such as indium, titanium, zinc, tin, chromium, aluminum, and germanium.

Providing the buffer layer with such electrical resistivity can suppress a pyroelectric effect such as a DC drift phenomenon of the LN substrate or the like as disclosed in Patent Literature No. 1 or 2.

In the optical waveguide device of the present invention, the upper buffer layer and the lower buffer layer may be configured with the same material or may be configured with different materials.

As a feature of the buffer layer applied to the optical waveguide device of the present invention, the thickness d2 of the upper buffer layer B2 is configured to be smaller than the thickness d1 of the lower buffer layer B1 (d2<d1) as illustrated in FIG. 2.

The lower buffer layer B1 is required to suppress an absorption loss of the light wave propagating through the optical waveguide and is also required to have a configuration having high joining strength for direct joining to the reinforcing substrate through the buffer layer.

The upper buffer layer B2 complements roughness of a surface of the optical waveguide caused by dry etching or the like in forming the optical waveguide, suppresses scattering of the propagating light, and suppresses absorption of the light wave by an electrode disposed on the upper buffer layer. Furthermore, in the present invention, stress applied to the optical waveguide substrate 1 (10) by the upper buffer layer B2 is alleviated. Particularly, application of internal stress to the protruding part (10) of the rib type waveguide substrate as in FIG. 2 is suppressed, and damage to the substrate 1 (optical waveguide 10) or peeling of the substrate 1 is prevented.

In order to achieve the above effect, for example, the thickness d1 of the lower buffer layer B1 is set within a range of 1 μm or higher and 10 μm or lower and more preferably 1 μm or higher and 3 μm or lower. In addition, the thickness d2 of the upper buffer layer B2 is set within a range of 0.1 μm or higher and 5 μm or lower and more preferably 0.1 μm or higher and 3 μm or lower. Particularly, considering stability of a manufacturing process, it is preferable to set a thickness of 0.1 μm or higher.

The buffer layer is formed as a film using various methods such as vapor-phase growth such as CVD, sputtering, and vacuum vapor deposition. In the case of forming the film using vapor-phase growth or sputtering, density of the film body is increased, compared to that of the film of vacuum vapor deposition. In the present invention, density of the lower buffer layer B1 is set to be higher than density of the upper buffer layer B2. Providing the lower buffer layer with higher density increases joining strength between the lower buffer layer and the reinforcing substrate or between the lower buffer layer and the optical waveguide substrate and can suppress a problem such as peeling of the substrate itself during polishing of the optical waveguide substrate of LN or the like as a thin plate. In addition, providing the upper buffer layer with lower density can further promote alleviation of the stress applied by the upper buffer layer.

For a coefficient of linear thermal expansion of each buffer layer, setting the upper buffer layer to have approximately the same coefficient of linear thermal expansion as the optical waveguide substrate 1 can alleviate an effect of the stress applied by the upper buffer layer. In addition, the lower buffer layer is preferably set to have a value of a coefficient of linear thermal expansion between those of both of the optical waveguide substrate and the reinforcing substrate because the lower buffer layer serves to join the optical waveguide substrate to the reinforcing substrate.

In addition, as the material constituting the upper buffer layer, a resin film that covers the optical waveguide may be used in order to suppress a propagation loss caused by the roughness of the surface of the rib type optical waveguide. The resin film includes a permanent resist film or the like and uses a material having a lower refractive index than the optical waveguide.

Figure 3:
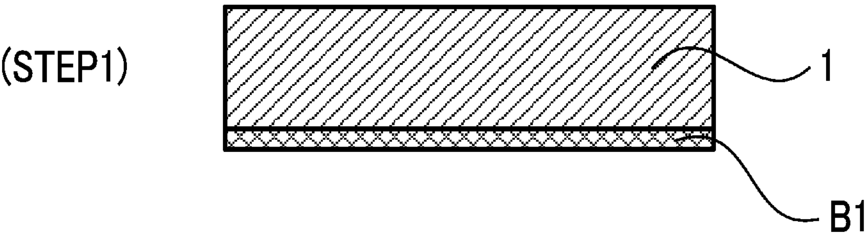
FIG. 3 is a diagram illustrating an example of a manufacturing process of the optical waveguide device of the present invention.
Figure 3:
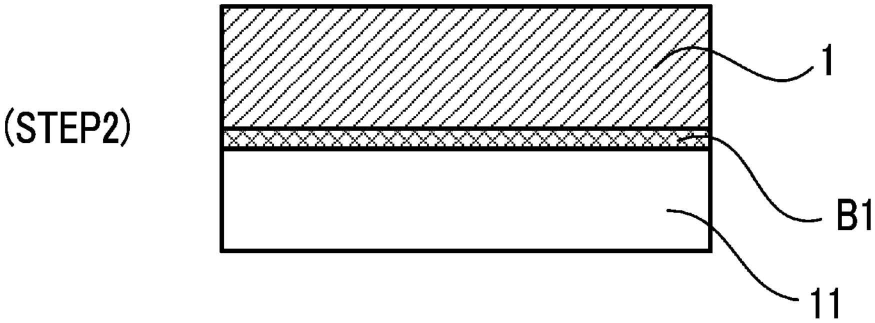
Figure 3:
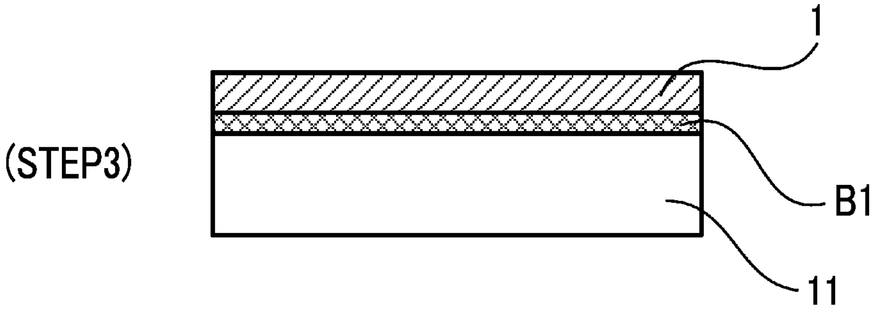
Figure 4:
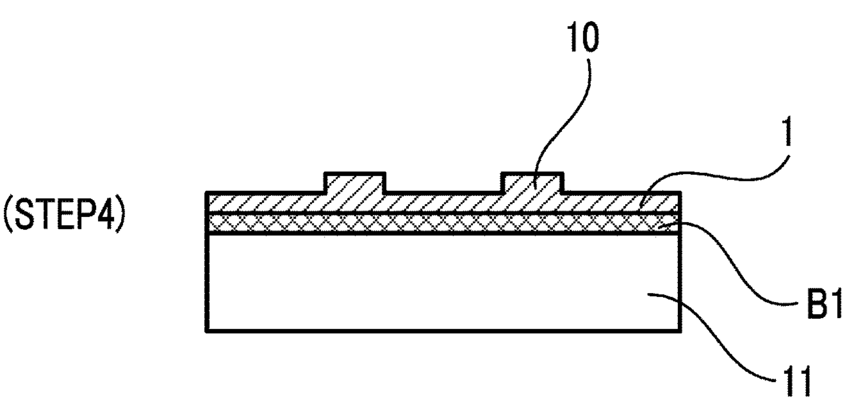
FIG. 4 is a diagram continuing from the manufacturing process in FIG. 3.
Figure 4:
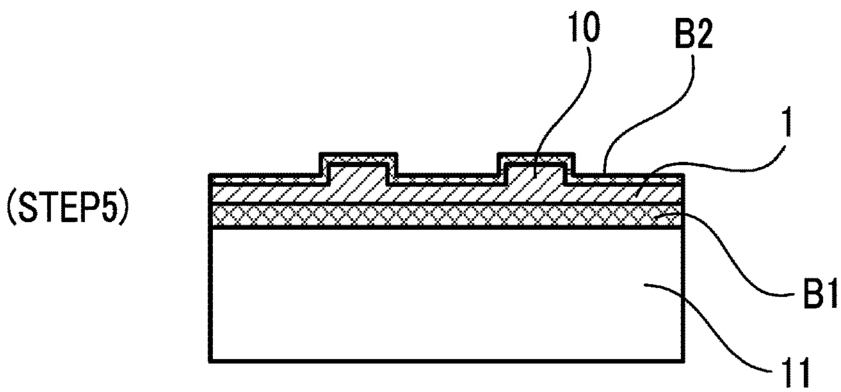
Figure 4:
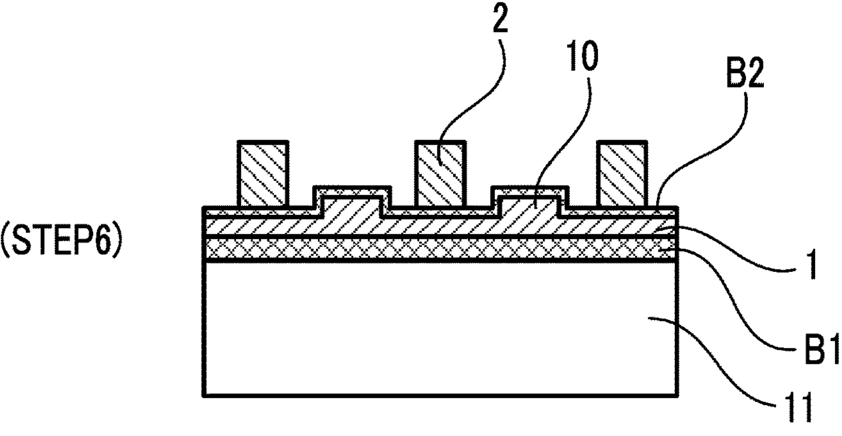

Next, manufacturing steps of the optical waveguide device of the present invention will be described with reference to FIGS. 3 and 4.

In a first step (STEP 1), a layer (for example, $SiO_2$) used as the lower buffer layer B1 is formed using sputtering or the like with respect to a layer (for example, an LN layer) used as the optical waveguide substrate 1.

In a second step (STEP 2), a lower surface of the layer used as the lower buffer layer B1 is directly joined to an upper surface of the reinforcing substrate 11 using a direct joining method. The direct joining method is a method suitable for joining materials of different types. As the direct joining method, a plasma-activated joining method or a fast atom beam (FAB) method can be used as shown in Patent Literature No. 1, as appropriate.

In a third step (STEP 3), the substrate 1 is processed to have an appropriate thickness by polishing an upper side of the substrate 1.

In a fourth step (STEP 4), the optical waveguide (10) is formed on the substrate 1 by removing a part other than the rib portion 10 using, for example, dry etching.

In a fifth step (STEP 5), the upper buffer layer B2 is deposited on the substrate 1 using, for example, vacuum vapor deposition.

In a sixth step (STEP 6), for example, an electrode 2 (for example, a signal electrode and a ground electrode, or a DC bias electrode) is formed on the upper buffer layer B2.

Next, examples of applying the optical waveguide device of the present invention to an optical modulation device and to an optical transmission apparatus will be described. While the optical modulation device using the optical waveguide device illustrated in FIG. 2 will be described below, the present invention is not limited to the optical modulation device in FIG. 2 and can also be applied to an optical phase modulator, an optical modulator having a polarization combining function, an optical waveguide device in which a larger number of Mach-Zehnder type optical waveguides are integrated, a device joined to an optical waveguide device including other materials such as silicon, a device used as a sensor, and the like. Furthermore, the present invention can, of course, be applied to a high bandwidth-coherent driver modulator (HB-CDM).

Figure 5:
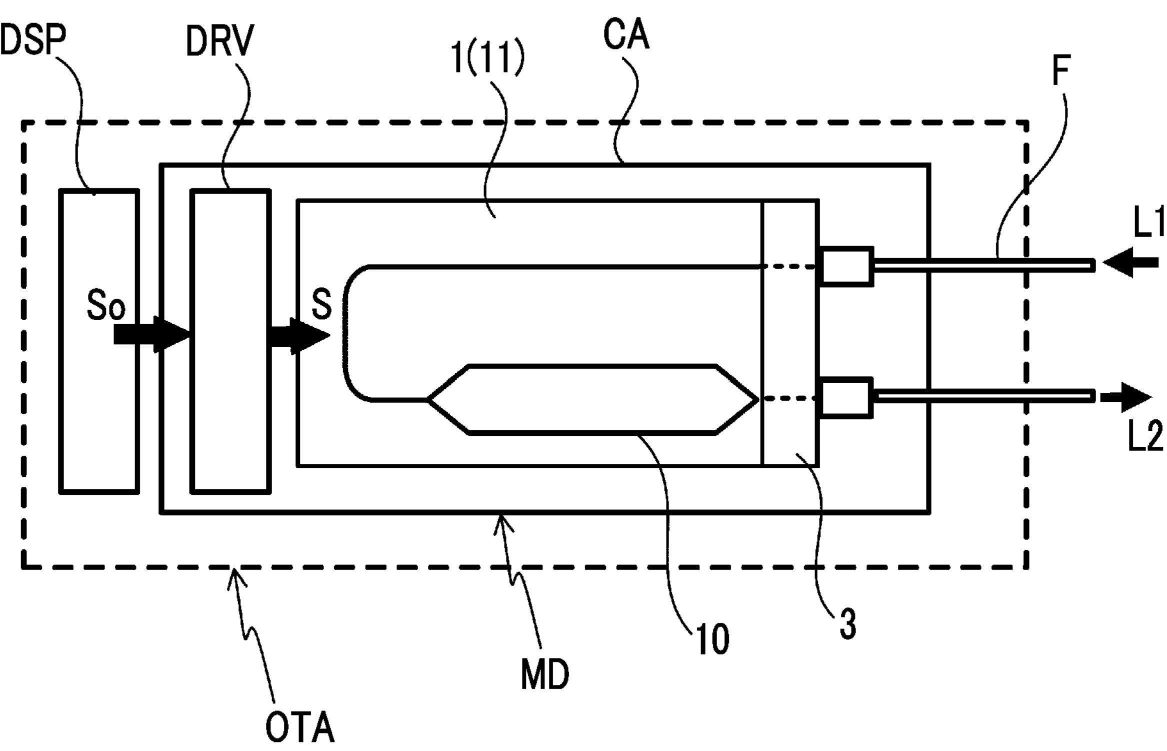
FIG. 5 is a plan view for describing an optical modulation device and an optical transmission apparatus of the present invention.

As illustrated in FIG. 5, the optical waveguide device includes the optical waveguide 10 formed on the optical waveguide substrate 1, and a modulation electrode (not illustrated) that modulates the light wave propagating through the optical waveguide 10. The optical waveguide device is accommodated inside a case CA. Furthermore, an optical modulation device MD can be configured by providing an optical fiber (F) through which the light wave is input into the optical waveguide or output from the optical waveguide. In FIG. 5, the optical fiber F is optically coupled to the optical waveguide 10 inside the optical waveguide device using an optical block including an optical lens, a lens barrel, and the like. The present invention is not limited to the optical fiber F in FIG. 5. The optical fiber may be introduced into the case through a through-hole that penetrates through a side wall of the case. The optical fiber may be directly joined to an optical component or to the substrate, or the optical fiber having a lens function in an end portion of the optical fiber may be optically coupled to the optical waveguide inside the optical waveguide device. In addition, a reinforcing member 3 can be disposed to overlap along an end surface of the optical waveguide substrate 1 in order to stably join the optical fiber to the optical block.

An optical transmission apparatus OTA can be configured by connecting, to the optical modulation device MD, an electronic circuit (digital signal processor DSP) that outputs a modulation signal So causing the optical modulation device MD to perform a modulation operation. In order to obtain a modulation signal S to be applied to the optical waveguide device, it is required to amplify the modulation signal So output from the digital signal processor DSP. Thus, in FIG. 5, the modulation signal is amplified using a driver circuit DRV. The driver circuit DRV and the digital signal processor DSP can be disposed outside the case CA or can be disposed inside the case CA. Particularly, disposing the driver circuit DRV inside the case can further reduce a propagation loss of the modulation signal from the driver circuit.

INDUSTRIAL APPLICABILITY

As described above, according to the present invention, it is possible to provide an optical waveguide device that prevents peeling of an optical waveguide substrate and that suppresses a propagation loss of a light wave of an optical waveguide. Furthermore, it is possible to provide an optical modulation device and an optical transmission apparatus using the optical waveguide device.

REFERENCE SIGNS LIST

1: substrate (thin plate, film body) on which optical waveguide is formed
10: optical waveguide
11: reinforcing substrate
B1: lower buffer layer
B2: upper buffer layer
F: optical fiber
CA: case
MD: optical modulation device
DRV: driver circuit
DSP: digital signal processor
OTA: optical transmission apparatus

The invention claimed is:

1. An optical waveguide device comprising:
an optical waveguide substrate having a rib type optical waveguide obtained by forming a part corresponding to a optical waveguide to have a protruding shape in a substrate having an electro-optic effect;
a reinforcing substrate disposed under the optical waveguide substrate;
a lower buffer layer disposed between the optical waveguide substrate and the reinforcing substrate to join both of the optical waveguide substrate and the reinforcing substrate; and
an upper buffer layer disposed on an upper side of the optical waveguide substrate in contact with the optical waveguide substrate,
wherein a thickness of the optical waveguide substrate is set to 1 μm or lower, the upper buffer layer and the lower buffer layer are configured with the same material,
a thickness of the upper buffer layer is formed to be smaller than a thickness of the lower buffer layer, and
density of the lower buffer layer is higher than density of the upper buffer layer.

2. The optical waveguide device according to claim 1,
wherein the thickness of the lower buffer layer is set within a range of 1 μm to 10 μm, and the thickness of the upper buffer layer is set within a range of 0.1 μm to 5 μm.

3. The optical waveguide device according to claim 1,
wherein the upper buffer layer and the lower buffer layer are transparent insulating films including silicon oxide, magnesium fluoride, calcium fluoride, a mixture of silicon oxide and an oxide of one or more elements selected from metal elements of groups 3 to 8, group 1b, and group 2b in a periodic table and semiconductor elements except silicon, or an oxide of silicon and one or more elements selected from the metal elements and the semiconductor elements.

4. The optical waveguide device according to claim 1,
wherein refractive indices of the upper buffer layer and the lower buffer layer are lower than a refractive index of the optical waveguide substrate.

5. The optical waveguide device according to claim 1,
wherein electrical resistivity of the upper buffer layer and the lower buffer layer is $10^8$ Ωcm or higher and $10^{16}$ Ωcm or lower.

6. An optical modulation device comprising:
the optical waveguide device according to claim 1;
a case accommodating the optical waveguide device; and
an optical fiber through which a light wave is input into the optical waveguide or output from the optical waveguide.

7. The optical modulation device according to claim 6,
wherein the optical waveguide device includes a modulation electrode for modulating a light wave propagating through the optical waveguide, and
an electronic circuit that amplifies a modulation signal to be input into the modulation electrode of the optical waveguide device is provided inside the case.

8. An optical transmission apparatus comprising:
the optical modulation device according to claim 6; and
an electronic circuit that outputs a modulation signal causing the optical modulation device to perform a modulation operation.

* * * * *